US008811664B2

(12) United States Patent
Dalal et al.

(10) Patent No.: US 8,811,664 B2
(45) Date of Patent: Aug. 19, 2014

(54) VEHICLE OCCUPANCY DETECTION VIA SINGLE BAND INFRARED IMAGING

(75) Inventors: Edul N. Dalal, Webster, NY (US); Peter Paul, Webster, NY (US); Lalit Keshav Mestha, Fairport, NY (US); Abu Saeed Islam, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 400 days.

(21) Appl. No.: 13/312,414

(22) Filed: Dec. 6, 2011

(65) Prior Publication Data

US 2013/0141574 A1 Jun. 6, 2013

(51) Int. Cl.
*G06K 9/00* (2006.01)
*G06K 9/46* (2006.01)

(52) U.S. Cl.
USPC ........... 382/103; 382/115; 382/118; 382/168; 382/190

(58) Field of Classification Search
CPC ........... G06T 2207/10016; G06T 5/40; G06K 9/3241; G07C 9/00158
USPC .......................... 382/103, 115, 118, 168, 190
See application file for complete search history.

(56) References Cited

U.S. PATENT DOCUMENTS

| 7,027,619 | B2 | 4/2006 | Pavlidis et al. | |
|---|---|---|---|---|
| 7,076,088 | B2 | 7/2006 | Pavlidis | |
| 7,738,140 | B2 | 6/2010 | Hancock et al. | |
| 2003/0169901 | A1* | 9/2003 | Pavlidis et al. | 382/103 |
| 2006/0104488 | A1* | 5/2006 | Bazakos et al. | 382/118 |
| 2008/0291479 | A1 | 11/2008 | Mestha et al. | |
| 2008/0291480 | A1 | 11/2008 | Mestha et al. | |
| 2009/0296154 | A1 | 12/2009 | Donaldson et al. | |
| 2010/0177366 | A1 | 7/2010 | Mestha et al. | |
| 2010/0296706 | A1* | 11/2010 | Kaneda et al. | 382/118 |
| 2012/0147194 | A1* | 6/2012 | Wang et al. | 348/164 |

OTHER PUBLICATIONS

Wang, et al., "Determining A Total Number Of People In An IR Image Obtained Via An IR Imaging System", U.S. Appl. No. 12/967,775, filed Dec. 14, 2010.
Mestha, et al., "Method for Classifying A Pixel Of A Hyperspectral Image In A Remote Sensing Application", U.S. Appl. No. 13/023,310, filed Feb. 8, 2011.
Wang, et al., "Determining A Number Of Objects In An IR Image", U.S. Appl. No. 13/086,006, filed Apr. 13, 2011.

(Continued)

Primary Examiner — Hung Dang
Assistant Examiner — Mishawn Dunn
(74) Attorney, Agent, or Firm — Philip E. Blair; Fleit Gibbons Gutman Bongini & Bianco P.L.

(57) ABSTRACT

What is disclosed is a method for vehicle occupancy detection using a single band infrared imaging system. First, an infrared image of a vehicle intended to be processed for human occupancy detection is captured using a single band infrared camera set to a predefined wavelength band. A candidate sub-image is identified within the captured image. A cumulative histogram is formed using the reflectance values of each pixel in the candidate region. A threshold reflectance value is then determined from the cumulative histogram using a pre-defined cumulative occurrence fraction value which corresponds to a value equivalent to an average sized human face. Embodiments for setting the threshold reflectance value are disclosed. Thereafter, human occupants can be distinguished in the image from the vehicle's interior by comparing pixel reflectances in the sub-image against the threshold reflectance value.

19 Claims, 12 Drawing Sheets

(56) References Cited

OTHER PUBLICATIONS

Fan, et al., "Front Seat Vehicle Occupancy Detection Via Seat Pattern Recognition", U.S. Appl. No. 13/215,401, filed Aug. 23, 2011.
Nilsson, et al., "Face Detection Using Local SMQT Features And Split Up SNoW Classifier", Blekinge Inst. of Tech., School of Eng., Ronneby, Sweden, Intl'l Conf. Acoustics Speech and Signal Proc. (ICASSP), Apr. 2007, pp. 589-592, ISSN: 1520-6149, Honolulu, HI.
Somashekar, et al., "Face Detection By SMQT Features And SNoW Classifier Using Color Information", Int'l Journal of Eng. Science and Technology (IJEST), vol. 3, No. 2, pp. 1266-1272, (Feb. 2011).
Gil et al., "Attribute Driven Gamut Mapping Via A Minimized Multi-Objective Cumulative Cost Function", U.S. Appl. No. 12/942,414, filed Nov. 9, 2010.
Wu, et al., "Optimal Spot Color Recipes Using Variable GCR Profiles", U.S. Appl. No. 12/902,669, filed Oct. 12, 2010.
Wu et al., "Updating A Smoothness Constrained Cluster Model For Color Control In A Color Management System", U.S. Appl. No. 12/969,854, filed Dec. 16, 2010.
Mestha et al., "A Cluster Model For Controlling Color In A Color Marking Device", U.S. Appl. No. 13/023,202, filed Feb. 8, 2011.
J.C. Spall, "An Overview of the Simultaneous Perturbation Method for Efficient Optimization", Johns Hopkins APL Technical Digest, pp. 482-492, vol. 19, (1998).
Yoshi Ohno, "CIE Fundamentals for Color Measurements", Proceedings IS&T NIP16 Int. Conf. on Digital Printing Technologies, pp. 540-545, (Oct. 2000).
G. Sharma, et al., "The CIEDE2000 Color-Difference Formula: Implementation Nodes, Supplementary Test Data, and Mathematical Observations", Color Research and Application, vol. 30, No. 1, (Feb. 2005).
Dowdall, Jonathan, et al., "Face Detection in the Near-IR Spectrum", Journal of Image and Vision Computing, 2003, pp. 565-578, vol. 21, No. 7.
Perez-Jiminez, Alberto J., et al., "High Occupancy Vehicle Detection", LNCS 5342, 2008, pp. 782-789. Springer-Verlag Berlin Heidelberg 2008.

\* cited by examiner

VEHICLE OCCUPANCY DETECTION VIA SINGLE BAND INFRARED IMAGING

TECHNICAL FIELD

The present invention is directed to systems and methods for vehicle occupancy detection which utilize a single band infrared (IR) imaging system operating at a pre-defined wavelength range of the electromagnetic spectrum to capture an infrared image of a motor vehicle traveling in a restricted lane of traffic.

BACKGROUND

Car-pool vehicles and other vehicles carrying multiple passengers reduce fuel consumption, pollution, and highway congestion, relative to single-occupancy vehicles. Highway authorities provide various incentives for high occupancy vehicles which include allowing such vehicles to travel in traffic lanes limited to high occupancy vehicles (HOV lanes) and traffic lanes where a toll charged is reduced or eliminated for high occupancy vehicles (HOT lanes). Monetary penalties are imposed on drivers of vehicles travelling with less than a predetermined number of occupants (e.g., less than 2) in these restricted lanes. Recent efforts have been directed toward sensing and image capture systems and methods to effectuate HOV lane enforcement. Further development in this art is needed as entirely automatic solutions for determining the number of occupants in a moving motor vehicle can be quite challenging. Semi-automatic methods that combine machine detection with human verification/inspection are valuable as such methods reduce the workload of human inspectors (law-enforcement officers) and increase the detection rate compared to methods involving entirely human inspection and detection. In the semi-automatic method, an alert signal together with images/video of the motor vehicle is sent to the law-enforcement officer, if an HOV lane violation is detected by the machine. The officer may verify the captured image and decide if further actions are necessary. Such methods increase the productivity of the traffic enforcement authorities.

Manual enforcement of HOV/HOT lanes by law enforcement officers can be difficult and potentially hazardous. Pulling violating motorists over to issue tickets tends to disrupt traffic and can become a safety hazard for both the officer and the vehicle's occupant. Consequently, automated occupancy detection (i.e., the ability to automatically detect human occupants of vehicles), preferably coupled with automated vehicle recognition and ticket mailing, is desirable.

While ordinary visible-light can be used for automated vehicle occupancy detection through the front windshield under ideal conditions, there are shortcomings in real-life traffic conditions. For example, cabin penetration using visible light is easily compromised by factors such as tinted side windshields as well as environmental conditions such as rain, snow, dirt, and the like. Moreover, artificial visible illumination at night may be distracting to drivers. Near infrared illumination has several advantages over visible light illumination including being unobservable by drivers. In the near infrared illumination band at wavelengths between 1.4 um and 2.8 um, human skin, whether light or dark, has reflectance values that are below that of other materials commonly found inside the passenger compartment of a motor vehicle, such as cotton, wool, polyamide, or leather. Such reflectances are shown in FIGS. 12A and 12B. Note that at wavelengths between 1.4 um and 2.8 um, both dark skin and light skin have reflectance values that are similar and that are relatively low values. At wavelengths less than 1.4 um, skin reflectance between dark skin and light skin, starts to diverge to values that are both relatively high and relatively lower, while the reflectance of common upholstery materials found inside the vehicle remains high. Hence the ability to specifically detect humans will improve by working in these critical wavelength bands. Not only does this make such a system more resistant to efforts to defeat it, but the task of human occupancy detection becomes more achievable and more reliable.

Accordingly, what is needed in this art is a system and method for vehicle occupancy detection which is accurate and robust to reflectance noise.

INCORPORATED REFERENCES

The following U.S. Patents, U.S. Patent Applications, and Publications are incorporated herein in their entirety by reference.

"Near-IR Human Detector", U.S. Pat. No. 6,829,370 by Pavlidis at al.

"Determining A Number Of Objects In An IR Image", U.S. patent application Ser. No. 13/086,006, by Wang et al.

"Determining A Total Number Of People In An IR Image Obtained Via An IR Imaging System", U.S. patent application Ser. No. 12/967,775, by Wang et al.

"Method For Classifying A Pixel Of A Hyperspectral Image In A Remote Sensing Application", U.S. patent application Ser. No. 13/023,310, by Mestha et al.

"*A Vehicle Occupant Counting System Based on Near-Infrared Phenomenology and Fuzzy Neural Classification*", I. Pavlidis, V. Morellas, and N. Papanikolopoulos. IEEE Transactions on Intelligent Transportation Systems, Vol. 1, No. 2, pp. 72-85, (June 2000).

"*Automated Vehicle Occupancy Monitoring*", P. Birch, R. C. D. Young, F. Claret-Tournier, and C. R. Catwin, Opt. Eng. 43(8), pp. 1828-1832, (August 2004).

"*A Near-Infrared Imaging Method For Capturing The Interior Of A Vehicle Through Windshield*", X. Hao, H. Chen, C. Yao, N, Yang, H. Bi, and C. Wang, IEEE SSIAI, pp. 109-112, (2010).

BRIEF SUMMARY

What is disclosed is a system and method for automated vehicle occupancy detection using a single-band infrared imaging system. The present system and method takes advantage of the property that human skin has a lower reflectance relative to other vehicle interior materials at selected near-infrared wavelengths. Once the image has been captured and the front windshield area isolated in the image, one or more human occupants can be differentiated in the interior passenger compartment from other materials detected in the vehicle's interior. Methods are provided herein for dynamically determining a threshold reflectance value which is used, in accordance with various embodiments hereof, to isolate pixels in the image which are categorized as human skin from pixels of other materials detected in the vehicle's interior and then determine the number of human occupants in the vehicle's passenger compartment.

One embodiment of the present method for vehicle occupancy detection involves performing the following. First, an infrared image of a vehicle intended to be processed for human occupancy detection is captured using a single band infrared camera which is preferably set to a predefined wavelength band. The captured image comprises a plurality of pixels each having a reflectance value detected at a predetermined wavelength band in the electromagnetic spectrum. A candidate sub-image is identified in the image and a cumulative histogram is formed using the reflectance values of pixels in the sub-image. In a manner more fully disclosed herein, a threshold reflectance value is determined from the cumulative histogram using a pre-defined cumulative occurrence fraction value. One or more human occupants can then be distinguished from other objects/materials detected in the interior of the vehicle. Various embodiments, including performance results, are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for vehicle occupancy detection which involves differentiating pixels categorized as human skin from other materials found in the vehicle's passenger compartment.

In many countries, automobiles are designed such that the driver sits on the right side and the passenger sits on the left side of the front passenger compartment. In other countries, automobiles are designed so that the driver's side of the front passenger compartment is on the left and the passenger side is on the right. It should be appreciated that any discussion herein referring to left and right side of the passenger compartment is intended to cover both designs and should not be viewed as limiting in any way.

NON-LIMITING DEFINITIONS

A "pixel" is the smallest addressable element in an image. The intensity of each pixel depends, in part, on the characteristics and sensitivity of the device used to measure that pixel.

Figure 1:
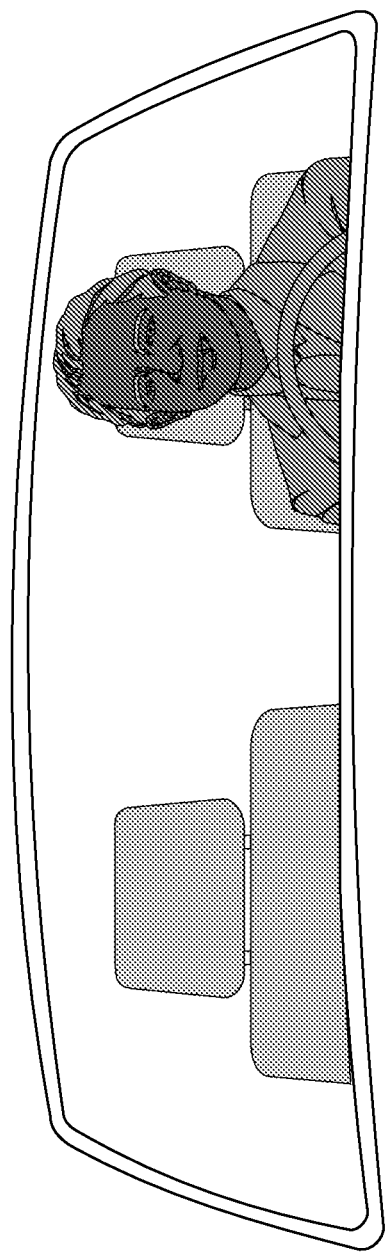
FIG. 1 shows an example IR image captured using a Xenics InGaAs near infrared camera and a PELCO wideband infrared illuminator, with the subject individual positioned behind a windshield of a 2005 Chevrolet Malibu sedan.

An "IR Image" is an image captured using an IR detection device. A fully-populated IR image consists of an array of pixels each having an intensity value at a desired spectral wavelength band. FIG. 1 shows an example IR image captured with an InGaAs camera using a 1.65 um bandpass filter.

Figure 2:
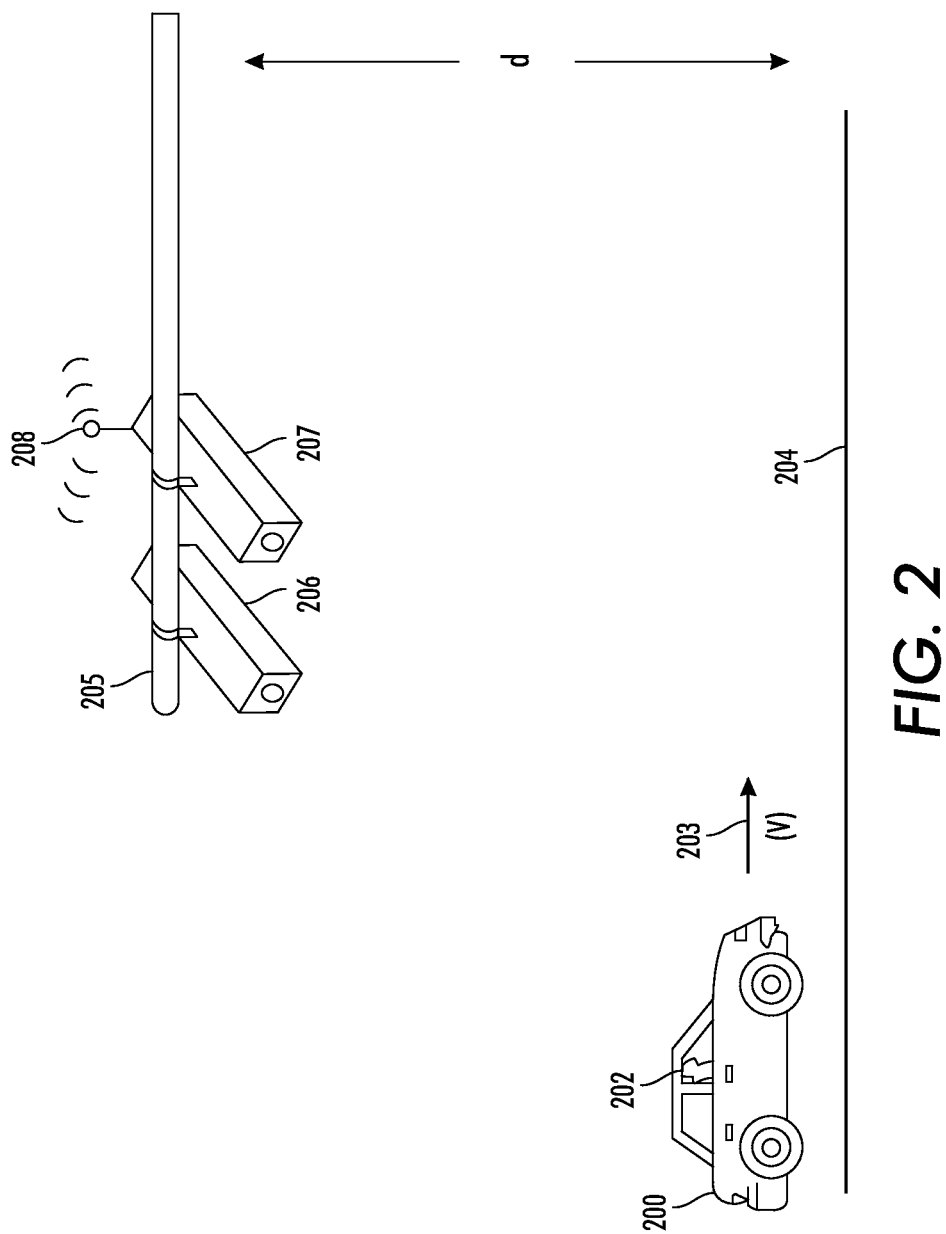
FIG. 2 shows an example vehicle occupancy detection system which incorporates an infrared camera system which transmits the captured image to a remote device for processing in accordance with the teachings hereof.

A "Single-Band IR Camera System" is a camera designed to capture an IR image of a desired wavelength band. In accordance with various embodiments hereof, a single-band infrared camera system is set to a predefined wavelength band covering at least a portion of the spectral range of 1.4 µm to 2.8 µm. One example camera system is provided by way of example in FIG. 2 shown generally comprising a video imaging system 207 having a transmission element 208 for communicating one or more captured images to a remote device, such as the workstation of FIG. 7, for processing in accordance with the teachings hereof. Driver 202 is driving vehicle 200 at velocity v in direction 203 along HOV/HOT lane 204. Positioned a distance d above lane 204 is support arm 205. Image capture system 207 is shown fixed to support arm 205. Camera 207 may further comprise a telephoto lens, one or more filters, and a polarizing lens to reduce glare. Also shown fixed to support arm 205 is illuminator 206 for illuminating motor vehicle 200 using a light source as may be required by camera 207. The imaging system of FIG. 2 is preferably defined such that the camera's field of view covers a single HOV/HOT lane. Operationally, a vehicle enters a detection zone and the camera is activated via a triggering mechanism such as, for instance, underground sensors, a laser beam, and the like. One or more images of the motor vehicle looking directly into the front windshield are captured for processing. It should be appreciated that the various elements of FIG. 2 are illustrative and are shown by way of example for explanatory purposes.

Figure 3:
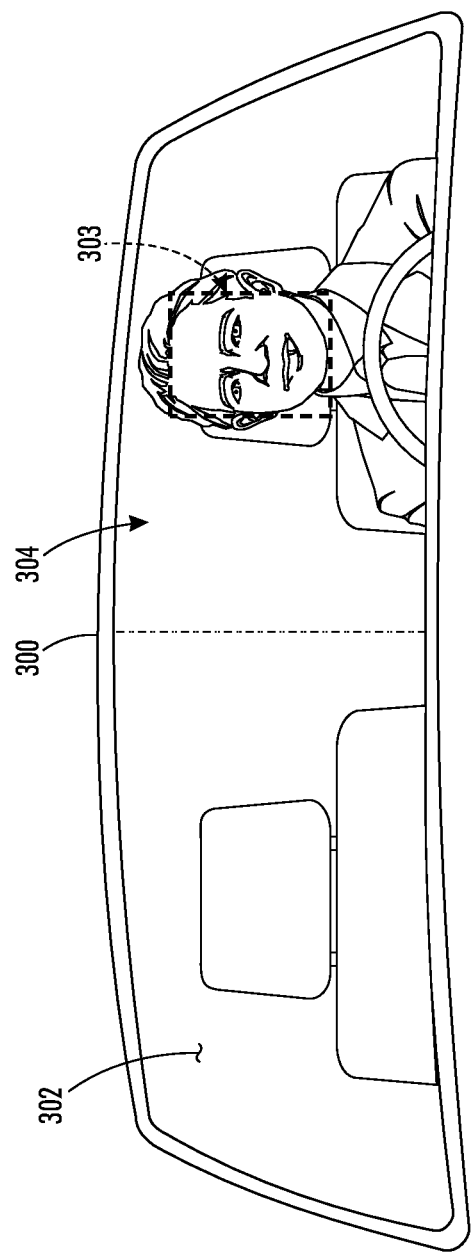
FIG. 3 illustrates a front passenger compartment of the motor vehicle of FIG. 2 looking into the interior of the vehicle through the front windshield.

A "candidate sub-image" is a portion of an IR image captured using the human occupancy detection system described with respect to FIG. 2. FIG. 3 shows an example candidate sub-image defined as the windshield area 302. Candidate sub-image region 302 has been clipped from the captured IR image of a motor vehicle 300 traveling in lane 204 using example IR camera 207.

A "candidate sub-image section" is a section of the candidate sub-image where a human is suspected to be located, for example, the likely half of the windshield containing the driver. An example candidate sub-image section is shown at 304 of the candidate sub-image 302 of FIG. 3.

A "candidate skin region" refers to an area of the image where a human has been detected by a rudimentary method, such as face detection. Further processing will be applied to the candidate skin region to verify if it truly contains human skin. An example candidate skin region is shown at 303 in FIG. 3.

Figure 4:
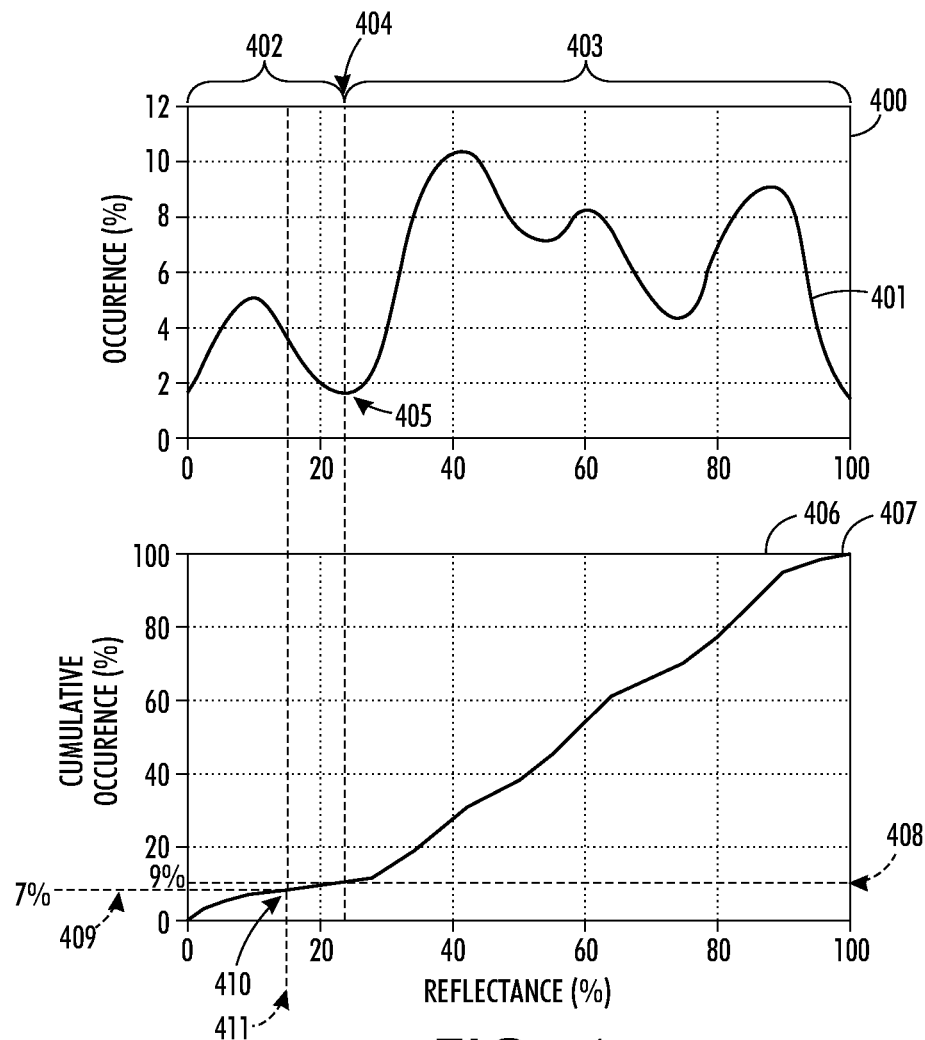
FIG. 4 is an example histogram of pixel reflectances determined to be in an example candidate sub-image such as the windshield area of FIG. 3.

A "threshold reflectance value" is a value which identifies a separation of pixels categorized as human skin from pixels categorized as other materials. Pixels having reflectance values below the threshold reflectance value are categorized as human skin. By way of example in FIG. 4, graph 400 plots a histogram function 401 of pixel reflectances obtained from the candidate sub-image. Reflectance values have been normalized to a value between 0 and 100. Pixels that fall within first section 402 are categorized as human skin. Pixels that fall within second section 403 are categorized as other materials. Threshold 404 serves as a line of demarcation between first section 402 and second section 403 of graph 400. Threshold reflectance value 404 is determined, in one embodiment, by determining a local minimum 405 in the cumulative histogram, in the vicinity of a pre-determined cumulative occurrence fraction (defined below), and setting the threshold reflectance value to the reflectance at or near the reflectance corresponding to that local minimum. The pre-determined cumulative fraction may be obtained based on the dimensions of an average human face within the given image. In another embodiment, a mean value is determined using the reflectance values of pixels in the candidate sub-image and the threshold reflectance value is set equal to the mean.

A "cumulative occurrence fraction" is a value determined by the cumulative occurrence of pixels of an average-sized human face within the given sub-image, i.e., the number of pixels in a candidate sub-image that can be categorized as human skin of the human facial region, relative to the total number of pixels in the same sub-image.

Example Flow Diagram

Figure 5:
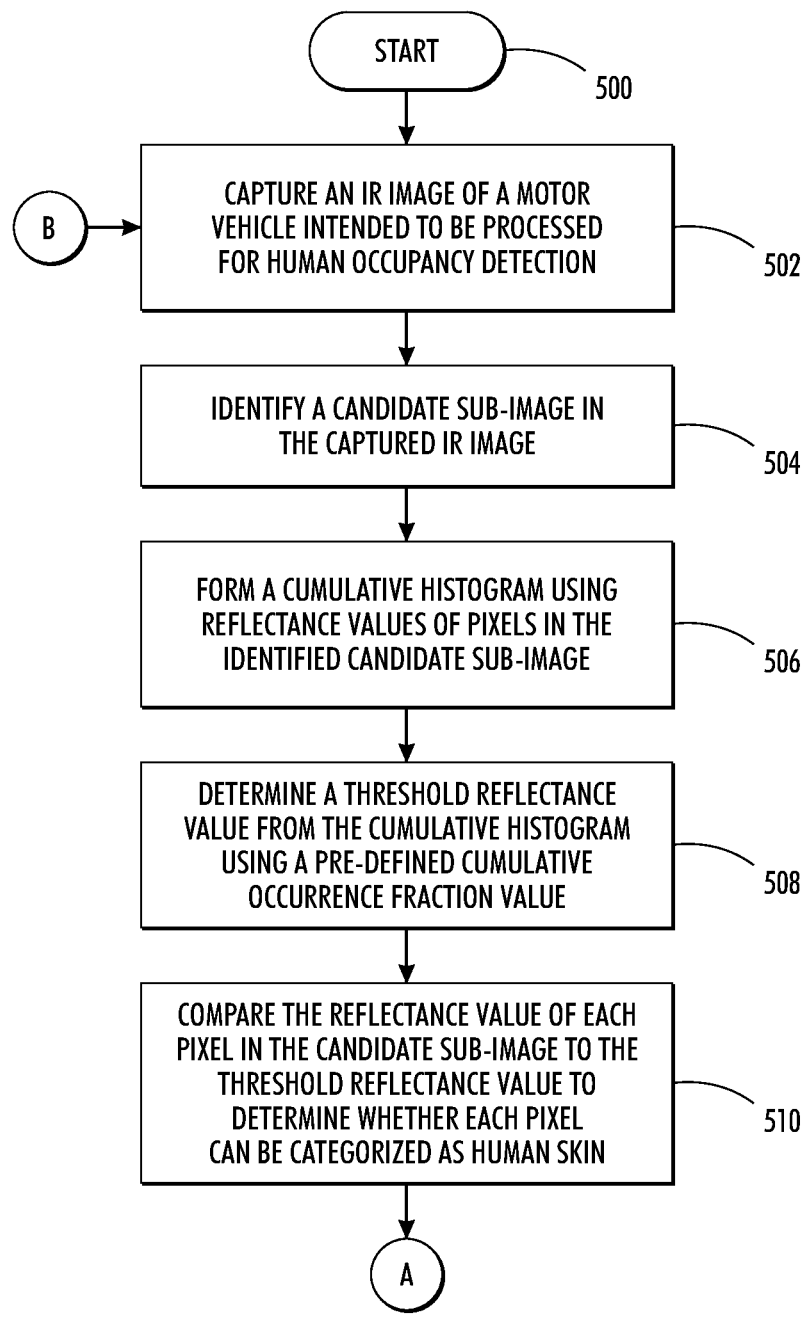
FIG. 5 is a flow diagram of one embodiment of the present method for vehicle occupancy detection using a single band infrared imaging system.

Reference is now being made to the flow diagram of FIG. 5 which illustrates one example embodiment of the present method for vehicle occupancy detection in accordance with various embodiments hereof. Flow processing starts at 500 and immediately proceeds to step 502.

At step 502, an infrared image is captured of a motor vehicle intended to be processed for human occupancy detection, in accordance with the teachings hereof. The infrared image is captured using a single band infrared camera system set to a wavelength band covering at least a portion of the range from 1.4 µm to 2.8 µm. One example system for capturing an IR image of a motor vehicle traveling in a HOV/HOT lane is shown and discussed with respect to FIG. 2. The captured IR image comprises a plurality of pixels each having a respective reflectance value. In other embodiments, the infrared image of the motor vehicle intended to be processed for human occupancy detection is received from another device either directly or over a network or is retrieved from a memory or storage device for processing.

At step 504, a candidate sub-image is identified in the captured IR image. In one embodiment, the candidate sub-image is identified as the windshield area of the motor vehicle which looks directly into the vehicle's front passenger compartment. One example candidate sub-image is shown and discussed with respect to the windshield area 302 of motor vehicle 300 of FIG. 3.

At step 506, a cumulative histogram is formed using the reflectance values of pixels in the candidate sub-image. Example histograms of pixel reflectance values are shown and discussed with respect to FIG. 4 and various embodiments of FIGS. 8-11.

At step 508, a threshold reflectance value is determined from the cumulative histogram using a pre-defined cumulative occurrence fraction value. The threshold reflectance value may comprise the mean value of reflectance values of pixels in the candidate sub-image. Alternatively, the threshold reflectance value may be determined by pre-determining a desired cumulative occurrence fraction, or by adjusting a pre-determined cumulative occurrence fraction value to correspond to a local minimum in the vicinity of the pre-determined cumulative occurrence fraction. The cumulative occurrence fraction, in turn, identifies a critical reflectance value and the threshold reflectance value is then set equal to the critical reflectance value.

At step 510, the reflectance value of each pixel in the candidate sub-image is compared to the threshold reflectance value to determine whether the pixel can be categorized as human skin. Such a comparison can be readily effectuated using software methods well known in the computer sciences.

Figure 6:
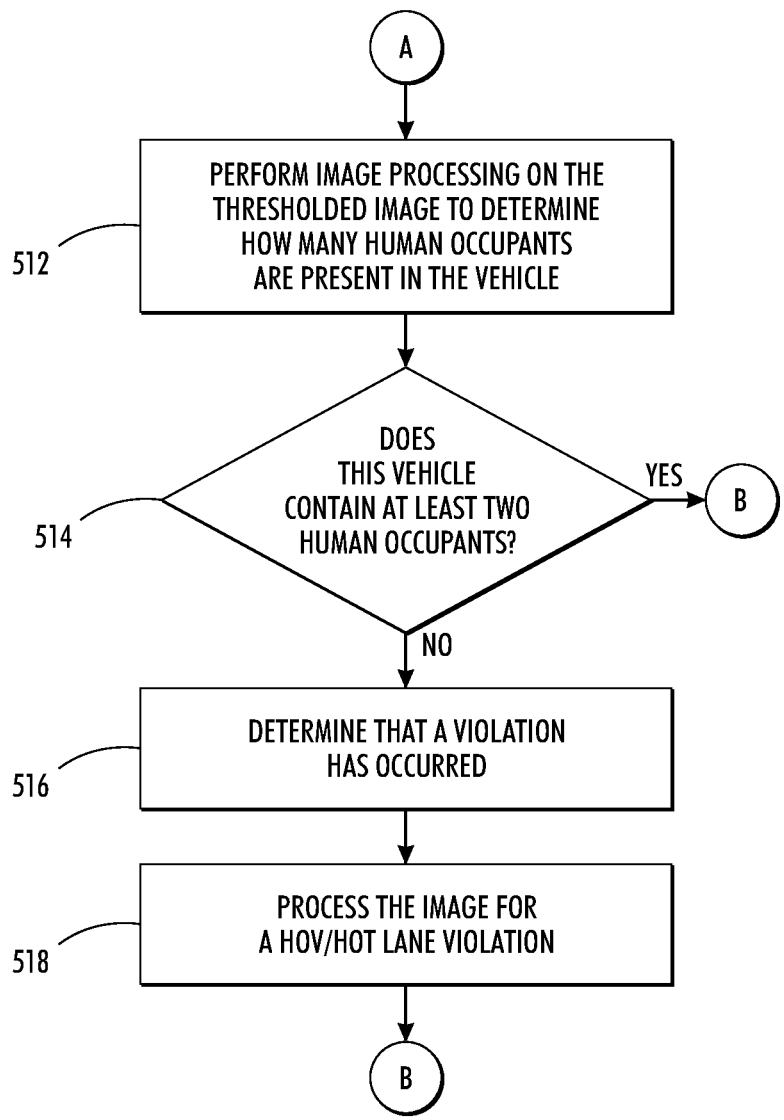
FIG. 6 is a continuation of the flow diagram of FIG. 5 with flow processing continuing with respect to node A.

Reference is now being made to FIG. 6 which is a continuation of the flow diagram of FIG. 5 with flow processing continuing with respect to node A.

At step 512, image processing is performed on the thresholded image to determine how many human occupants are present in the vehicle. Thereafter, processing continues with respect to step 514.

At step 514, a determination is made whether the vehicle contains at least two human occupants in the vehicle's passenger compartment. If not then, at step 516, a violation is determined to have occurred in the HOV/HOT lane wherein this motor vehicle is traveling. Processing then proceeds to step 518 wherein the image is processed for a traffic violation. A traffic ticket may then be issued to the driver of the motor vehicle using, for example, the vehicle's license plate or toll pass transponder signal for vehicle identification and vehicle ownership verification. Alternatively, a signal is transmitted to a law enforcement agency so that the motor vehicle can be stopped for visual inspection by a police officer. In yet another embodiment, the image is sent to the display device of an operator of the vehicle occupancy detection system for visual verification and further processing. Thereafter, processing repeats with respect to node B wherein, at step 502, a next image is captured of a next motor vehicle or the next image is otherwise received or retrieved for processing. If, at step 514, at least two human occupants are determined to be in the passenger compartment of the motor vehicle under examination then a violation has not occurred and processing repeats with respect to node B wherein a next image is captured or otherwise received for processing. Processing repeats in such a manner until the vehicle occupancy detection system is taken offline.

It should be appreciated that various aspects of the embodiment of the flow diagrams of FIGS. 5 and 6 are intended to be used in those vehicle occupancy detection systems where a violation occurs when the front passenger compartment of the motor vehicle traveling in a HOV/HOT lane does not contain at least two passengers. The teachings hereof are equally applicable to identifying a total number of passengers in the rear compartment of a motor vehicle.

Example Image Processing System

Figure 7:
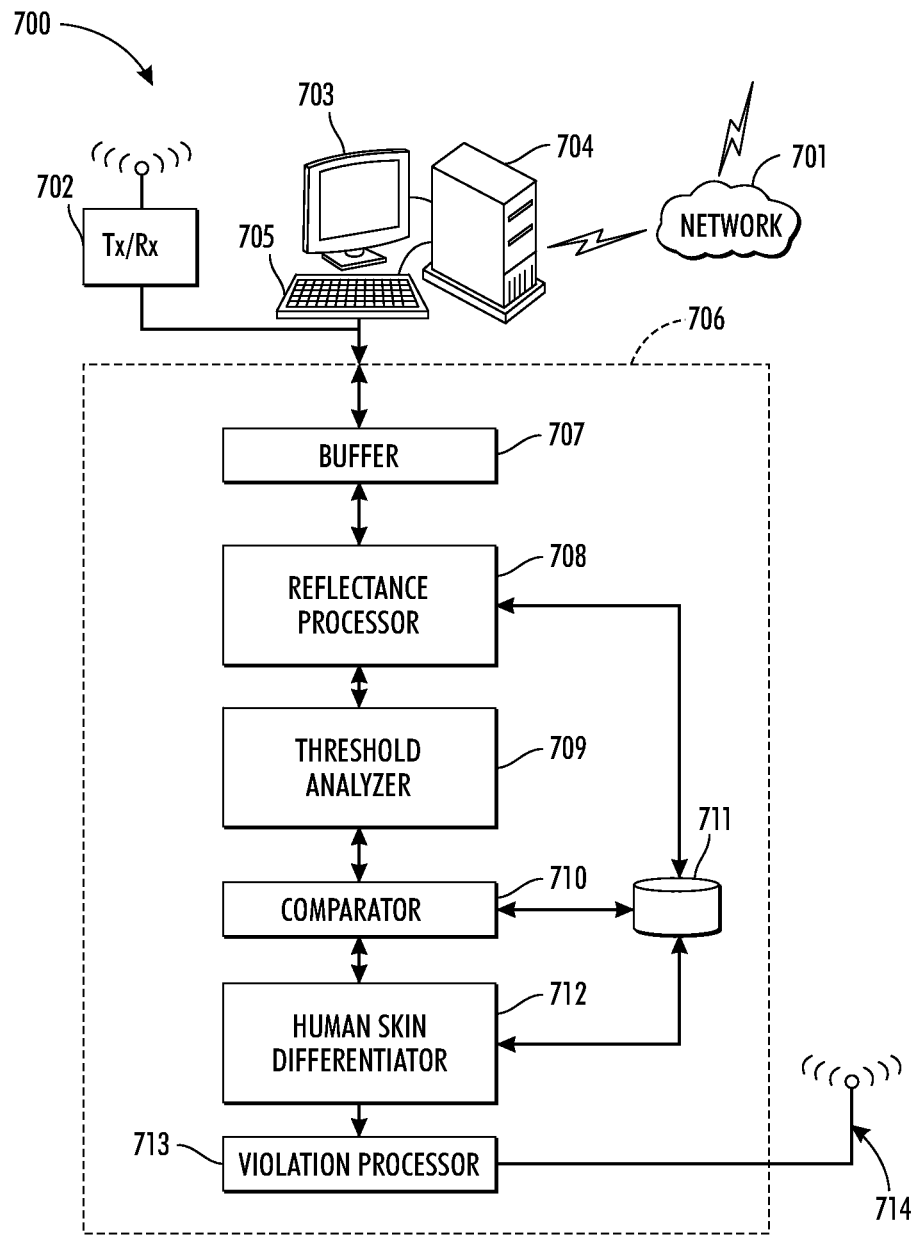
FIG. 7 is a block diagram of an example image processing system for implementing various aspects of the present method.

Reference is now being made to FIG. 7 which illustrates a block diagram of one example system 700 capable of implementing various aspects of the present method as described with respect to the flow diagrams of FIGS. 5 and 6.

A workstation 704 is placed in communication with image receiver 702 for receiving pixel values from detection device 207 of FIG. 2, and for otherwise effectuating communication between computer 704 and detection device 207, for example, by wire or wirelessly or via the internet. Computer 704 further comprises monitor device 703 and user interface 705 for enabling a display of information for a user and for effectuating a user input or selection such as, for example, validating a detected violation. An operator of the present vehicle occupancy detection system may use the graphical user interface 703 and 705 to identify or otherwise select pixels and/or the candidate sub-image for processing or re-processing, and provide user input as may be required for the implementation hereof such as, for example, defining or adjusting the cumulative occurrence fraction value and determining the critical reflectance value. Pixels and/or regions identified or otherwise detected in the received image may be retrieved from a remote device over network 701. Various portions of the captured image of the motor vehicle may be stored to a memory or storage device 711 in communication with workstation 704 or may be communicated to a remote device over network 701 via a communications interface (not shown) for remote storage or further processing. Workstation 704 and communications interface 702 are in communication with Image Processing Unit 706 for processing the captured image in accordance with the teachings hereof.

In the embodiment of FIG. 7, Image Processing Unit 706 is shown comprising a buffer 707. Such a buffer may be used for queuing information about the received IR image such as, for instance, regions of interest within the image, size of the image, time/date and the like. Such a buffer may be configured to also store data, mathematical formulas and other representations to facilitate processing of the image in accordance with the teachings hereof.

Reflectance Processor 708 processes the reflectance values of the captured image and forms a cumulative histogram using the reflectance values of pixels in the candidate sub-image. Processor 708 may further store one or more cumulative histograms to storage device 711 and retrieve information from device 711 as needed for processing the cumulative histograms generated thereby.

Threshold Analyzer Module 709 receives the cumulative histogram from Processor 708 and determines a threshold reflectance value from the cumulative histogram using a pre-defined cumulative occurrence fraction value retrieved from storage device 711 or received via the user interface of workstation 704. Threshold Analyzer 709 may effectuate the determination of the threshold reflectance value by calculating a local minimum or by determining a mean value, as discussed herein. Analyzer 709 may further effectuate the determination of the threshold reflectance value by receiving a user selection of a pre-defined or desired cumulative occurrence fraction or the pre-determined cumulative occurrence fraction value having been adjusted by a user to a desired value and, in turn, identifying a critical reflectance value in the cumulative histogram and setting the threshold reflectance value to a value which is near or equal to the critical reflectance.

Comparator Module 710 is in communication with Threshold Analyzer 709 and storage device 711 and receives from Analyzer 709 the determined threshold reflectance value. Module 701 compares the reflectance values of each pixel in the candidate sub-image to the threshold reflectance value and determines whether a given pixel being examined can be categorized as human skin. Information as required to perform such a comparison is uploaded from storage device 711 or may be received via a user input using the graphical user interface of workstation 704. Module 710 may further store the respective categorization of each pixel in the identified candidate sub-image to storage device 711 or to a remote device for further processing as may be required using, for example, an interface device such as a network card (not shown) in communication such remote device over network 701.

Once all the pixels in the identified candidate sub-image have been processed accordingly and optionally stored, Human Skin Differentiator 712 receives or otherwise retrieves the processed and categorized pixels and determines whether one or more human occupants can be differentiated in the candidate sub-image region of the captured IR image. Differentiator 712 provides the determined number of human occupants to Violation Processor 714 which determines whether a HOV/HOT violation has occurred based on the lane being traveled, the time of day, and the detected number of occupants in the motor vehicle. Processor 714 is in communication with transmitter 714 which effectuates a communication to a law enforcement authority. Such a communication may take the form of providing some or all of the original IR image of the motor vehicle or some or all of the candidate sub-image to the authorities for possible follow-up investigations or the issuance of a ticket for a traffic violation. Such a signal may further be transmitted to a law enforcement agency so that the motor vehicle can be stopped for a visual verification of the number of occupants in that vehicle. The image may be displayed on the display device of an operator of the vehicle occupancy detection system, such as that of workstation 704, for visual verification and further processing. Facial detection algorithms and software may be retrieved from memory 711 such that a facial detection is performed on the received captured image.

Any of the modules hereof are in communication with monitor 703 to present thereon information for a user selection. Various information such as variables, and the like, are stored and/or retrieved from storage device 712. Any of the modules and/or processing units of FIG. 7 are in communication with storage device 712 via pathways shown and not shown and may store/retrieve data, parameter values, functions, pages, records, and machine readable/executable program instructions required to perform their various functions. Each of the modules and processing units of Image Processing System 706 is also in communication with workstation 704 via pathways not shown and may further be in communication with one or more remote devices over network 701. It should be appreciated that some or all of the functionality for any of the modules may be performed, in whole or in part, by components internal to the workstation.

Performance Results

A windshield from a 2005 Chevrolet Malibu sedan was used along with a Xenics InGaAs near infrared camera operating in a wavelength range of 0.9 um to 1.7 um, and a PELCO wideband infrared illuminator. The camera had a 1650 nm bandpass filter installed to limit the images to a specific spectral range. The camera and illuminator are positioned on a head-on geometry (azimuth angle equals 0 degrees), and pointed slightly down (elevation angle approximately −5 degrees), at about 10 feet away from the windshield and 11 feet away from the subjects. The human subject was behind the windshield and imaged using this system. The image is zoomed-in due to the lens used, i.e., the outline of the windshield is outside the field of view of the camera with this particular lens. As expected, the skin pixels are much darker than the cloth pixels in the subject's shirt and jacket and are much darker than the paper background. At 1650 nm, skin reflectance is relatively lower than other materials such as cloth. As such, it is expected that skin pixels will be darker than other materials in the image.

Figure 8:
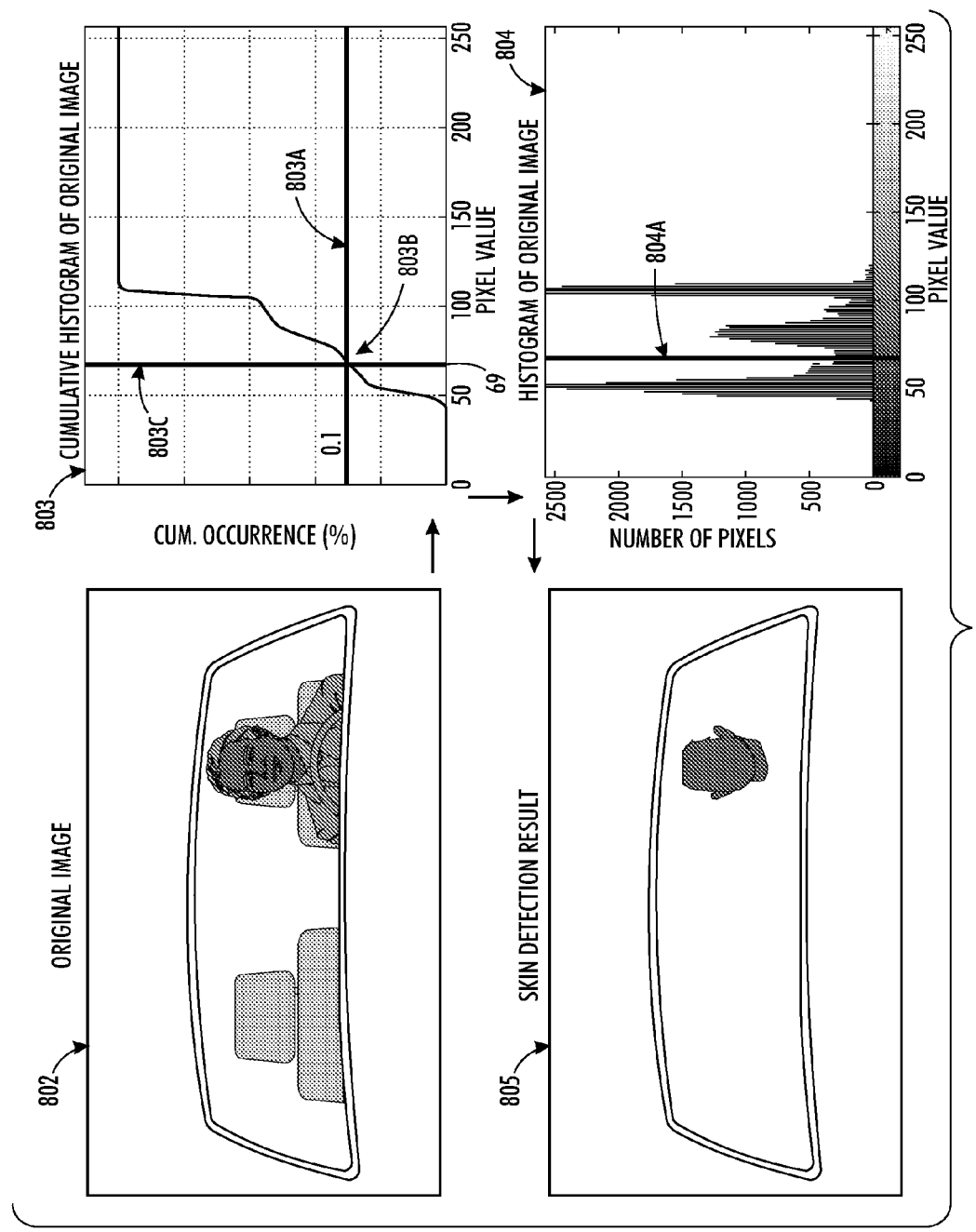
FIGS. 8-11 show various performance results.

In FIG. 8, on the upper left image 802 is the original image of the subject behind the windshield. The second panel 803 is a cumulative histogram of the pixel values in the original image 802. Based on the zoomed-in nature of the scene (due to limitations of the set up), one would expect a human face to comprise about 33% of the pixels in the image. Therefore an initial value for a threshold should be that pixel value associated with a cumulative occurrence fraction of 0.33 (at 803A). A threshold reflectance value is chosen based on the local minimum 803B. This corresponds to a threshold reflectance value 803C of approximately 69 (69/255=27%). This can be seen in the histogram 804 of the original image (at 804A). Note that the initial threshold reflectance value 803C determined using the expected cumulative occurrence fraction can be used as a starting point for a minimum seeking algorithm operating on the histogram function 804 to improve the initial threshold to ensure that it corresponds with the nearest local minimum in the histogram function 804. Minimum seeking algorithms are well known to practitioners of the art. Thresholding the image data using this threshold value generates image 805 which demonstrates that the human in the captured image has been successfully differentiated from the background materials.

Figure 9:
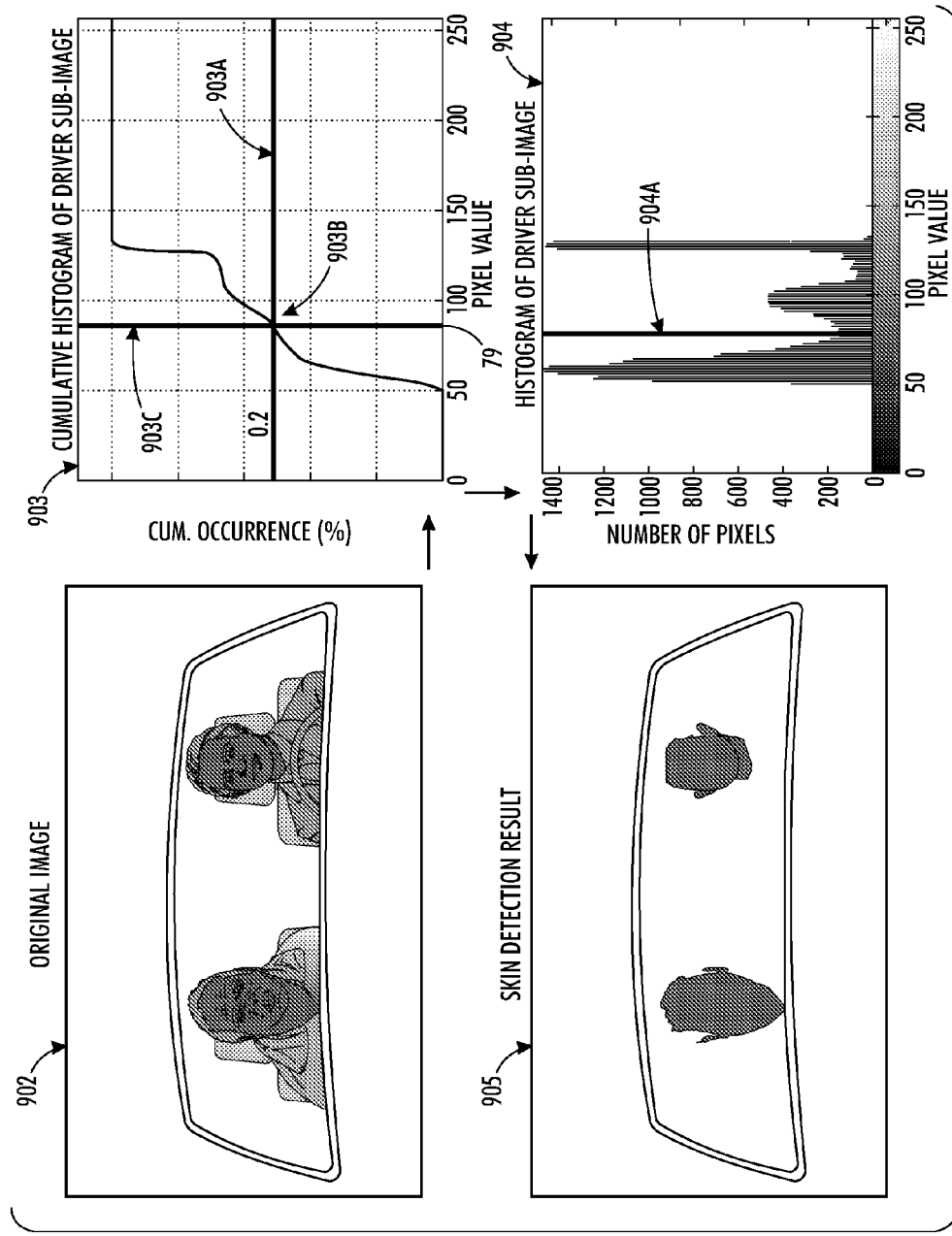

In FIG. 9, since the field of view in the setup was relatively small, image 902 further contains a human hand, in an effort to depict a "driver" and "passenger". The "driver" is determined to roughly occupy approximately 50% of the image pixels. A cumulative histogram for the driver sub-image is performed and the results are depicted in the upper right panel 903. The pixel value corresponding to 50% cumulative occurrence 903A is used to determine the local minimum 903B in the driver sub-image histogram. This, in turn, indicates a threshold reflectance value 903C of approximately 79 (79/255=31%). This threshold reflectance value is used to threshold both the "driver" and the "passenger" in the original image. This threshold can be seen in the histogram 904 of the driver sub-image 904A. Note that the initial threshold reflectance value 903C determined using the expected cumulative occurrence fraction can be used as a starting point for a minimum seeking algorithm operating on the histogram function 904 to improve the initial threshold to ensure that it corresponds with the nearest local minimum in the histogram function 804. Minimum seeking algorithms are well known to practitioners of the art. The results are depicted in the image 905. As is demonstrated, the driver and the "passenger" (hand) have been successfully differentiated from background materials in the image. It is worth pointing out that the hand was from a different person than the face in the image, and the hand and face were from people with different skin color.

Figure 10:
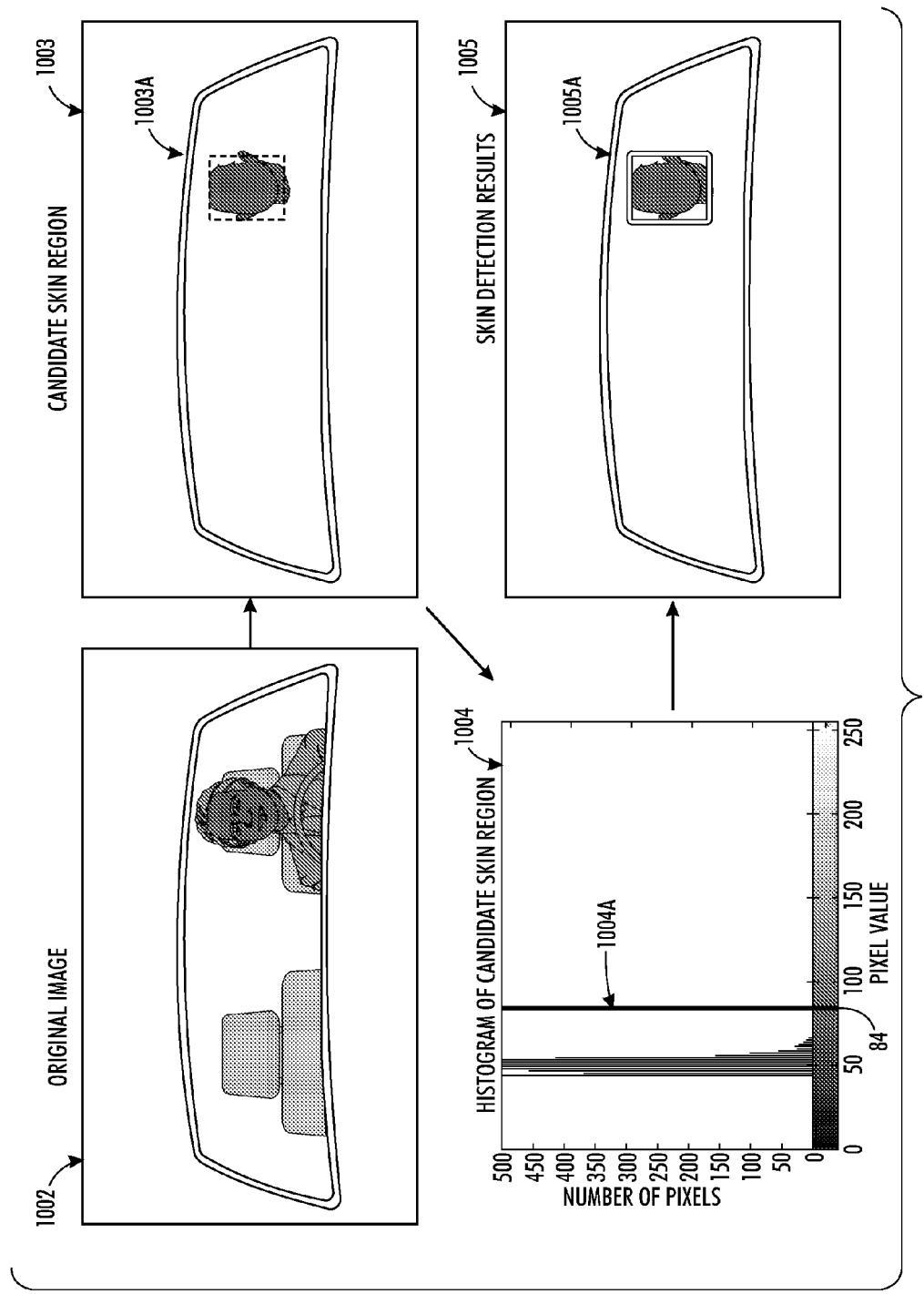
Figure 11:
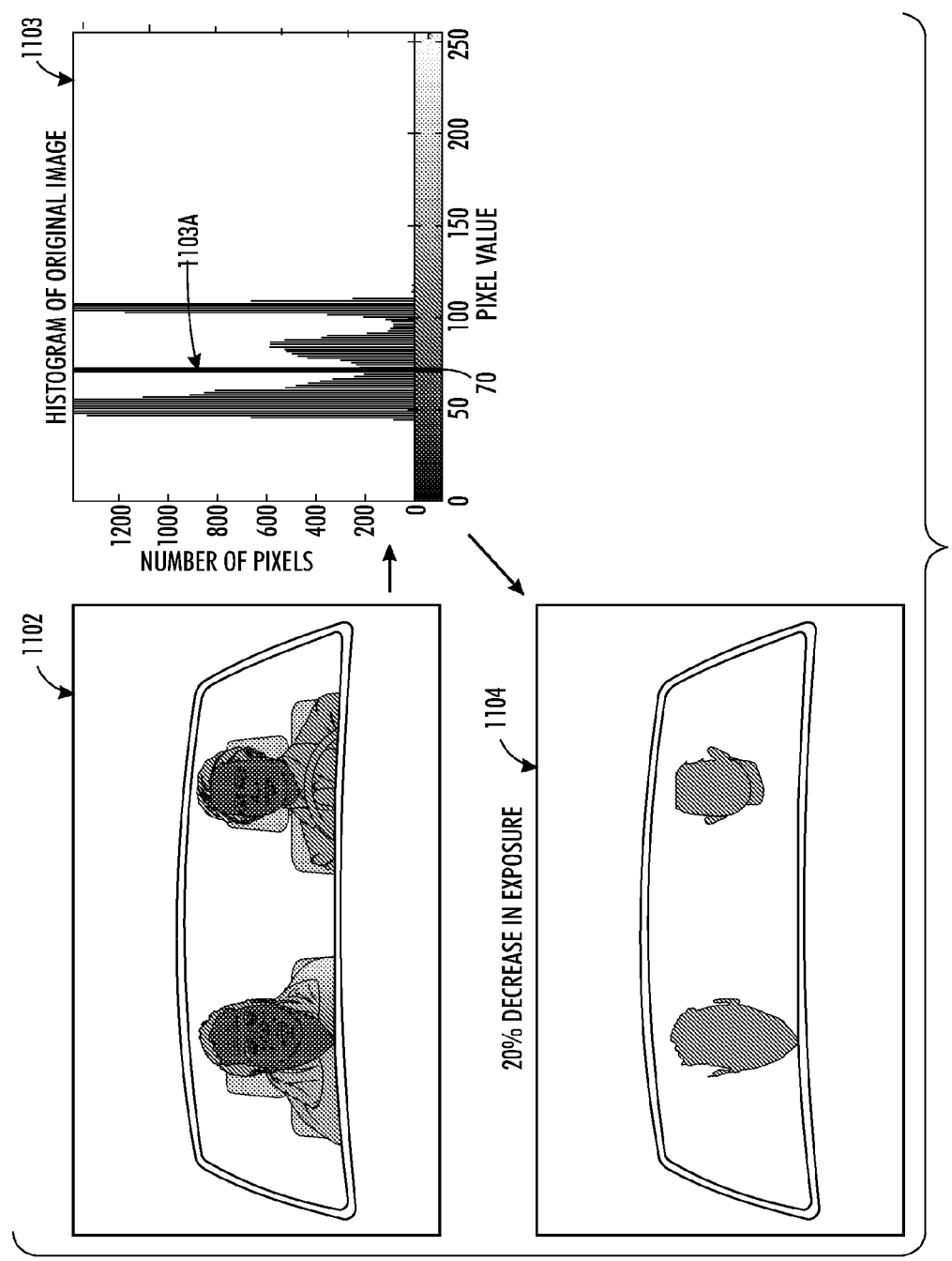
Figure 12A:
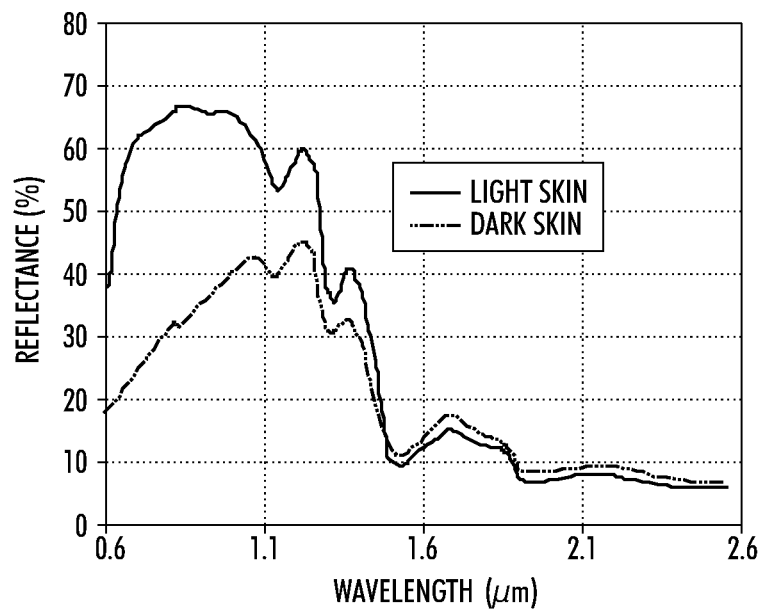
FIGS. 12A-B are charts of near infrared reflectances of human skin (12A) and reflectances of common upholstery materials found in a motor vehicle (12B).
Figure 12B:
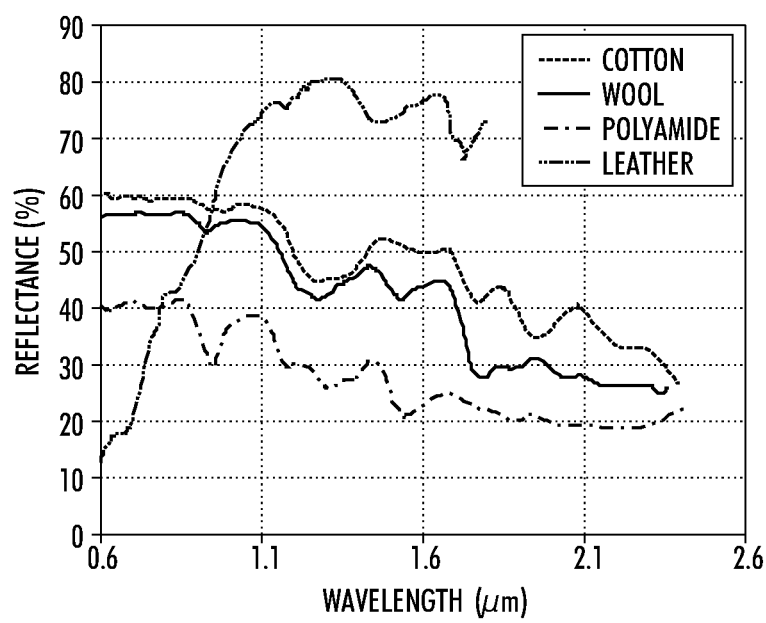

In FIG. 10, the upper left image 1002 was captured. Image 1003 shows the candidate skin region 1003A extracted from image 1002. The candidate skin region was identified in the image using a face detection algorithm. Panel 1004 shows a histogram of the pixel values in the candidate skin region. A mean value 1004A of all pixels in the original image has been computed. The mean value is approximately 84. Pixel values from the candidate skin region 1003A that are below the mean value are shown in panel 1005 in area 1005A. This corresponds to roughly all the pixels in the area identified as candidate skin pixels 1003A. This result demonstrates that the skin pixels of the identified candidate area are real skin pixels. Thus, the human occupant has been successfully differentiated in image 1002.

Because the image content itself is used to derive the thresholding value in a manner as described herein, the present method is robust to variations in reflectance due to, for instance, weather, variations in windshield coatings and materials, dirt on the windshield, and the like. To demonstrate the robustness hereof to such variations in reflectance, camera exposure time of the above-described setup was varied to emulate variations in captured IR energy. Image 1102 of FIG. 11 was captured with an exposure time that was decreased by approximately 20%. The threshold derived from the driver sub-image was approximately 70 (at 1103A of panel 1003). In the image 1104, the "passenger" (hand) and "driver" were again differentiated from the background materials in the captured image. Note that if the threshold value derived from the non-decreased exposure time is used, i.e., the threshold value of 79 in the results of FIG. 9, then incorrect pixel differentiation is observed.

Various modules of the embodiments hereof may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

It should be understood that the flow diagrams depicted herein are illustrative. One or more of the operations illustrated in any of the flow diagrams may be performed in a differing order. Other operations may be added, modified, enhanced, condensed, integrated, or consolidated. Variations thereof are intended to fall within the scope of the appended claims. All or portions of the flow diagrams may be implemented partially or fully in hardware in conjunction with machine executable instructions in communication with various components of such a system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or image processing system embodying executable program instructions capable of performing the methodology described in the flow diagrams.

Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for vehicle occupancy detection using a single band infrared imaging system operating at a pre-defined wavelength range of the electromagnetic spectrum, the method comprising:
   capturing an infrared image of a vehicle intended to be processed for human occupancy detection, said image being captured with a single band infrared camera, said image comprising a plurality of pixels each having a reflectance value;
   identifying a candidate sub-image in said captured infrared image;
   dividing said candidate sub-image into at least two distinct sections such that one of said sections is likely to contain a driver of said vehicle;

adjusting said cumulative occurrence fraction value to compensate for a reduced area of said section containing said driver relative to said candidate sub-image;

forming a cumulative histogram using reflectance values of pixels in said section containing said driver;

determining a threshold reflectance value from said cumulative histogram using said adjusted cumulative occurrence fraction value;

differentiating at least one human occupant in said section of said vehicle containing said driver by comparing reflectance values of pixels in said section containing said driver against said threshold reflectance value; and differentiating human occupants, if any are present, from the interior of said vehicle, in the remaining sections, using said threshold reflectance value determined from said section containing said driver.

2. The method of claim 1, wherein said cumulative occurrence fraction value is determined relative to an average-sized human face.

3. The method of claim 1, wherein said candidate sub-image comprises a portion of said image defining a windshield area of said motor vehicle.

4. The method of claim 1, wherein differentiating a human occupant from said interior of said motor vehicle comprises determining the presence of at least one human occupant in said motor vehicle in response to reflectance values of pixels in said candidate sub-image being below said threshold reflectance value.

5. The method of claim 1, wherein determining said threshold reflectance value comprises:

using said cumulative histogram and said cumulative occurrence fraction value to determine a critical reflectance value; and setting said threshold reflectance value to said critical reflectance value.

6. The method of claim 1, wherein determining said threshold reflectance value comprises:

using said cumulative histogram and said cumulative occurrence fraction value to determine a critical reflectance value;

forming a histogram function using reflectance values of pixels in said sub-image;

determining a local minimum in said histogram function in a vicinity of said critical reflectance value; and setting said threshold reflectance value to a function of a reflectance value associated with said local minimum.

7. The method of claim 6, wherein said threshold reflectance value is set equal to said reflectance value associated with said local minimum.

8. The method of claim 1, wherein said infrared image of said motor vehicle is captured using a single band infrared camera system set to a wavelength band covering at least a portion of the range from 1.4 μm to 2.8 μm.

9. A vehicle occupancy detection system comprising:

a single band infrared imaging system operating at a pre-defined wavelength range of the electromagnetic spectrum;

a memory and a storage medium; and a processor in communication with said imaging system, said storage medium and said memory, said processor executing machine readable instructions for performing:

capturing an infrared mage of a vehicle intended to be processed for human occupancy detection, said image being captured with a single band infrared camera, said image comprising a plurality of pixels each having a reflectance value;

identifying a candidate sub-image in said captured infrared image;

dividing said candidate sub-image into at least two distinct sections, such that one of said sections is likely to contain a driver of said vehicle;

adjusting said cumulative occurrence fraction value to compensate for a reduced area of said section containing said driver, relative to said candidate sub-image;

forming a cumulative histogram using reflectance values of pixels in said section containing said candidate sub-image;

determining a threshold reflectance value from said cumulative histogram using said adjusted cumulative occurrence fraction value;

differentiating at least one human occupant in said section of said vehicle containing said driver by comparing reflectance values of pixels in said section containing said driver against said threshold reflectance value; and differentiating human occupants, if any are present, from the interior of said vehicle, in the remaining sections, using said threshold reflectance value determined from said section containing said driver.

10. The system of claim 9, wherein said cumulative occurrence fraction value is determined relative to an average-sized human face.

11. The system of claim 9, wherein said candidate sub-image comprises a portion of said image defining a windshield area of said motor vehicle.

12. The system of claim 9, wherein differentiating a human occupant from said interior of said motor vehicle comprises determining the presence of at least one human occupant in said motor vehicle in response to reflectance values of pixels in said candidate sub-image being below said threshold reflectance value.

13. The system of claim 9, wherein determining said threshold reflectance value comprises:

using said cumulative histogram and said cumulative occurrence fraction value to determine a critical reflectance value; and setting said threshold reflectance value to said critical reflectance value.

14. The system of claim 9, wherein determining said threshold reflectance value comprises:

using said cumulative histogram and said cumulative occurrence fraction value to determine a critical reflectance value; and forming a histogram function using reflectance values of pixels in said sub-image;

determining a local minimum in said histogram in a vicinity of said critical reflectance value; and setting said threshold reflectance value equal to a reflectance value associated with said local minimum.

15. The system of claim 9, wherein said infrared image of said motor vehicle is captured using a single band infrared camera system set to a wavelength band covering at least a portion of the range from 1.4 μm to 2.8 μm.

16. A method for vehicle occupancy detection using a single band infrared imaging system, the method comprising:

capturing an infrared image of a vehicle intended to be processed for human occupancy detection, said infrared image being captured using a single band infrared camera, said image having a plurality of pixels each having a reflectance value obtained at a pre-defined wavelength band of the electromagnetic spectrum;

determining a mean value of said reflectance values;

setting a threshold value equal to said mean value;

identifying a candidate skin region in said infrared image;

dividing said candidate sub-image into at least two distinct sections, such that one of said sections is likely to contain a driver of said vehicle;

adjusting said cumulative occurrence fraction value to compensate for a reduced area of said section containing said driver, relative to said candidate sub-image;

forming a cumulative histogram using reflectance values of pixels in said section containing said driver;

determining a threshold reflectance value from said cumulative histogram, using said adjusted cumulative occurrence fraction value;

differentiating at least one human occupant in said section an interior of said motor vehicle containing said driver by comparing said reflectance values of each pixel in said section containing said driver against said threshold value; and differentiating human occupants, if any are present, from the interior of said vehicle, in the remaining sections, using said threshold reflectance value determined from said section containing said driver.

17. The method of claim 16, wherein said infrared image of said motor vehicle is captured using a single band infrared camera system set to a wavelength band covering at least a portion of the range from 1.4 μm to 2.8 μm.

18. The method of claim 16, wherein determining said threshold reflectance value comprises:

using said cumulative histogram and said cumulative occurrence fraction value to determine a critical reflectance value; and setting said threshold reflectance value to said critical reflectance value.

19. The method of claim 16, wherein determining said threshold reflectance value comprises:

using said cumulative histogram and said cumulative occurrence fraction value to determine a critical reflectance value; and forming a histogram function using reflectance values of pixels in said sub-image;

determining a local minimum in said histogram in a vicinity of said critical reflectance value; and setting said threshold reflectance value equal to a reflectance value associated with said local minimum.

* * * * *